US011873857B2

United States Patent
Williams

(10) Patent No.: US 11,873,857 B2
(45) Date of Patent: Jan. 16, 2024

(54) METHOD FOR JOINING TWO WORKPIECES

(71) Applicant: Atlas Copco IAS UK Limited, Flintshire (GB)

(72) Inventor: Samuel Williams, Cheshire (GB)

(73) Assignee: Atlas Copco IAS UK Limited, Flintshire (GB)

( * ) Notice: Subject to any disclaimer, the term of this patent is extended or adjusted under 35 U.S.C. 154(b) by 731 days.

(21) Appl. No.: 17/040,639

(22) PCT Filed: Mar. 11, 2019

(86) PCT No.: PCT/EP2019/055974
§ 371 (c)(1),
(2) Date: Sep. 23, 2020

(87) PCT Pub. No.: WO2019/219265
PCT Pub. Date: Nov. 21, 2019

(65) Prior Publication Data
US 2021/0115954 A1 Apr. 22, 2021

(30) Foreign Application Priority Data
May 17, 2018 (DE) ...................... 10 2018 111 857.0

(51) Int. Cl.
*F16B 11/00* (2006.01)
*F16B 5/04* (2006.01)
*F16B 5/08* (2006.01)

(52) U.S. Cl.
CPC .................. *F16B 5/04* (2013.01); *F16B 5/08* (2013.01); *F16B 11/006* (2013.01)

(58) Field of Classification Search
CPC .. F16B 5/04; F16B 5/08; F16B 11/006; Y10T 403/472; B32B 37/1292
See application file for complete search history.

(56) References Cited

U.S. PATENT DOCUMENTS

| 4,471,519 A | 9/1984 | Capello et al. |
| 4,727,232 A * | 2/1988 | Omori ................... F16B 11/006 219/118 |

(Continued)

FOREIGN PATENT DOCUMENTS

| CN | 102574190 A | 7/2012 |
| CN | 103168082 A | 6/2013 |

(Continued)

OTHER PUBLICATIONS

Chinese Office Action dated Dec. 17, 2021 in Chinese Application No. 201980030161.6 with English translation.

(Continued)

*Primary Examiner* — Michael P Ferguson
(74) *Attorney, Agent, or Firm* — Collard & Roe, P.C.

(57) ABSTRACT

A method for joining two workpieces, which each have a joining surface for joining the workpieces, applies a viscous adhesive to a first joining surface in the form of a continuous material strand along an application path extending in an application direction. The joining surfaces are arranged facing each other in order to delimit an intermediate gap, in which the material strand is arranged. The workpieces are joined to each other in the region of the material strand by at least one further joining device. The first joining surface includes an alternately arranged hybrid adhering regions and adhering regions. A further joining device is arranged in each hybrid adhering region. The adhesive amount applied in each length unit measured in the application direction in the hybrid adhering regions is less than the adhesive amount applied in each length unit measured in the application direction in the adhering regions.

12 Claims, 1 Drawing Sheet

(56) References Cited

U.S. PATENT DOCUMENTS

Figure 1:
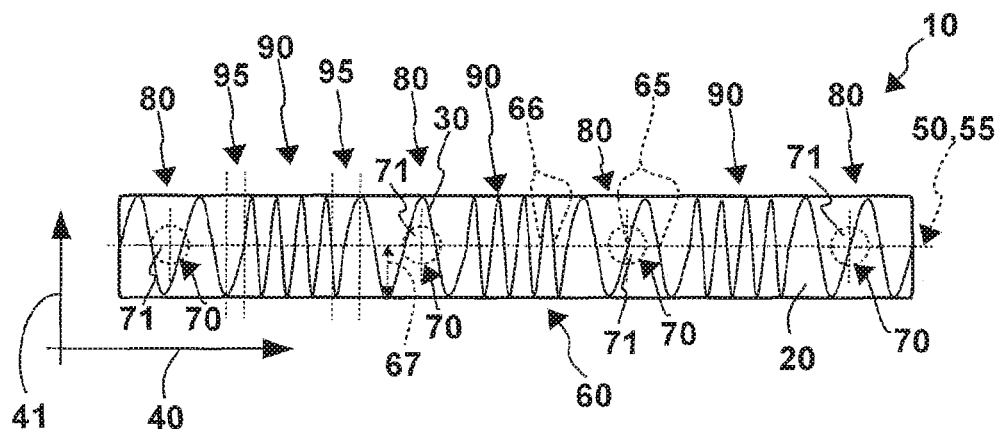

| | | | |
|---|---|---|---|
| 8,181,327 B2 * | 5/2012 | Apfel | F16B 5/00 |
| | | | 156/92 |
| 9,751,571 B2 * | 9/2017 | Iwase | F16B 5/04 |
| 9,919,744 B2 | 3/2018 | Gonda et al. | |
| 10,112,230 B2 | 10/2018 | Dubugnon et al. | |
| 2001/0030011 A1 | 10/2001 | Nasli-Bakir et al. | |
| 2003/0170091 A1 | 9/2003 | Shomler et al. | |
| 2004/0081794 A1 * | 4/2004 | Titone | D04H 3/05 |
| | | | 156/167 |
| 2005/0244215 A1 | 11/2005 | Prat et al. | |
| 2005/0269027 A1 | 12/2005 | Ondrus et al. | |
| 2012/0124805 A1 | 5/2012 | Dubugnon et al. | |
| 2013/0168004 A1 | 7/2013 | Saito | |
| 2014/0246148 A1 | 9/2014 | Liu et al. | |
| 2015/0275944 A1 | 10/2015 | Duenisch et al. | |
| 2018/0066693 A1 * | 3/2018 | Busby | B32B 15/095 |

FOREIGN PATENT DOCUMENTS

| | | | | |
|---|---|---|---|---|
| CN | 104812659 A | | 7/2015 | |
| DE | 37 37 210 | * | 5/1989 | B62D 27/02 |
| DE | 103 47 652 A1 | | 5/2005 | |
| DE | 10 2006 039 718 A1 | | 4/2007 | |
| DE | 10 2007 022 133 A1 | | 2/2008 | |
| DE | 10 2007 010 540 A1 | | 9/2008 | |
| DE | 10 2009 049 386 A1 | | 4/2011 | |
| JP | H01-185383 A | | 7/1989 | |
| JP | H03-146160 A | | 6/1991 | |
| JP | 2003-519026 A | | 6/2003 | |
| JP | 2005-155671 A | | 6/2005 | |
| JP | 2007-321880 A | | 12/2007 | |
| JP | 2008-215423 A | | 9/2008 | |
| JP | 2010-271836 A | | 12/2010 | |
| JP | 2013-130238 A | | 7/2013 | |
| WO | 2011/038338 A2 | | 3/2011 | |
| WO | 2012/027243 A2 | | 3/2012 | |
| WO | 2014/111301 A1 | | 7/2014 | |

OTHER PUBLICATIONS

Second Chinese Office Action dated Jul. 25, 2022, with search report, in Chinese Application No. 201980030161.6.
Japanese Office Action dated Aug. 23, 2022, with Search Report, in Japanese Application No. 2020-562745 with English translation.
Notification of Transmittal of Translation of the International Preliminary Report on Patentability with attached English translation of the International Preliminary Report on Patentability in PCT/EP2019/055974, dated Nov. 19, 2020.
International Search Report in PCT/EP2019/055974, dated May 23, 2019.
German Search Report in DE 10 2018 111 857.0, dated Jan. 22, 2019, with English translation of relevant parts.
Chinese Office Action in CN 201980030161.6, dated Jan. 3, 2023.

* cited by examiner

METHOD FOR JOINING TWO WORKPIECES

CROSS REFERENCE TO RELATED APPLICATIONS

This application is the National Stage of PCT/EP2019/055974 filed on Mar. 11, 2019, which claims priority under 35 U.S.C. § 119 of German Application No. 10 2018 111 857.0 filed on May 17, 2018, the disclosure of which is incorporated by reference. The international application under PCT article 21(2) was not published in English.

The invention relates to a method for joining two preferably flat workpieces, in particular two metal sheets, in accordance with the preamble of claim 1. The invention furthermore relates to an arrangement of two flat workpieces that are joined to one another in accordance with such a method.

Such a method is described, for example, in DE 10 2006 039 718 A1. In the case of known methods of this type, hybrid connectors are generally used to join two flat workpieces, for example metal sheets or the like, which connectors have joining bodies such as rivets, and in addition utilize a viscous adhesive for joining the workpieces. To join the workpieces, the adhesive is first applied to a joining surface of one workpiece. The two workpieces are then arranged one on top of the other, wherein they delimit an intermediate gap between them, in which gap the adhesive is arranged. The two workpieces are subsequently fixed in place on one another by means of the joining bodies. The adhesive can then harden. During introduction of the joining bodies, air can be pressed into the intermediate gap that is filled with adhesive. As a result, air chambers filled with air or air exit channels can occur in the adhesive. These can be open toward the atmosphere under some circumstances, and as a result, moisture can penetrate. This makes the connection susceptible to corrosion. Similar problems occur if other further joining means, such as weld connections, for example, are used in place of the joining bodies.

The task of the invention therefore lies in further developing a method of the type mentioned initially in such a manner that better joining of the workpieces is achieved.

This task is accomplished using the technical teaching of claim 1.

The basic idea of the present invention lies in that the amount of adhesive applied in the hybrid adhesion regions, in which the workpieces are joined to one another with the aid of a further joining means, in each instance, per length unit measured in the application direction, in each instance, is less than the amount of adhesive applied in the adhesion regions, per length unit measured in the application direction, in each instance. Therefore less adhesive is arranged per length unit in the hybrid adhesion regions than in the adhesion regions in which the workpieces are joined to one another only by means of the adhesive. The adhesive arranged in the intermediate gap can be better distributed due to the reduced amount of adhesive in the hybrid adhesion regions. In this way, the effect is achieved that less adhesive is needed for covering the joining surfaces than in the case of conventional methods. Furthermore, this has the effect that the adhesive is distributed uniformly and over a large area over the hybrid adhesion regions and the adhesion regions, in other words over the joining surfaces, during fixation of the two workpieces. As a result, the joining surfaces are covered with adhesive to a high degree, for example up to 95%, with simultaneous reduction of the consumption of adhesive. Furthermore, bulging of the workpieces in the adhesion regions, transverse to the application direction, also referred to as "quilting" or as "formation of adhesive pockets," which is attributable to non-uniformly distributed amounts of adhesive, can be reduced, whereas in the state of the art, uniform adhesive application or a reduction in the amount of adhesive in the region between the rivets or weld points is viewed as advantageous in this regard.

The invention furthermore relates to an arrangement of at least two workpieces, which are arranged in pairs, lying at least partially opposite one another, and delimit an intermediate gap. An adhesive is arranged in at least one of the intermediate gaps, which adhesive is applied to a first joining surface of a workpiece in accordance with the method described initially, so as to join the workpieces to one another. In addition, the workpieces are joined to one another with the aid of further joining means such as joining bodies or weld points, for example.

The method according to the invention can be used, in particular, for thin workpieces, which can be flat or curved. Two workpieces composed of the same material or two workpieces composed of different materials can be joined to one another. In particular, metal sheets, for example composed of steel, aluminum or magnesium, die-cast parts, or workpieces composed of plastic reinforced with carbon fibers can be used.

Preferably, the material strand forms a pattern having a wave, zigzag or saw-tooth shape, in such a manner that it is applied oscillating about a center line of the application track. Oscillating means that the material strand oscillates about the center line, so to speak, so that the material strand has intersection points with the center line. The pattern allows air that has been introduced with the aid of the further joining means to be conducted away to the environment, so that the formation of disruptive air channels in the hardened state of the adhesive is at least reduced.

The pattern has a component transverse to the application direction. The application track can run along the first joining surface in straight or curved manner, so that the application direction is constant with reference to the first joining surface or can change at certain points or continuously. Preferably, the further joining means pass through the center line.

Preferably, the distance between two consecutive intersection points of the pattern with the center line is greater in the hybrid adhesion regions than in the adhesion regions. As a result, less adhesive material is applied per length unit in the application direction in the hybrid adhesion regions. The distance between two consecutive intersection points of the pattern can define a frequency with the center line, with which the material strand is applied to the first joining surface, a strand frequency, so to speak. The strand frequency is then less in the hybrid adhesion regions than in the adhesion regions. In particular, the pattern can correspond to a sine-shaped oscillation.

Alternatively or in addition to this, the maximum deflection of the pattern with reference to the center line can be less in the hybrid adhesion regions than in the adhesion regions. This has the effect that less adhesive is applied per length unit in the application direction in the hybrid adhesion regions than in the adhesion regions. The maximum deflection of the pattern with reference to the center line can also be referred to as the amplitude of the pattern. In particular, the amplitude and/or the frequency of the pattern can be practically zero, in terms of amount, in the hybrid adhesion regions, so that here, the material strand has the shape of a thin line that coincides with the center line.

A preferred concept provides that the distance between two consecutive intersection points of the pattern with the center line is constant within the hybrid adhesion regions and the adhesion regions, in each instance, and/or that the maximum deflection of the pattern with reference to the center line is constant within the hybrid adhesion regions and the adhesion regions, in each instance. Furthermore, a transition region can be arranged between a hybrid adhesion region and an adhesion region, in each instance, in which transition region the maximum deflection of the pattern with reference to the center line and/or the distance between two consecutive intersection points of the pattern with the center line changes continuously or suddenly.

According to the invention, the material strand can also have a variable strand cross-section, wherein the strand cross-section is smaller in the hybrid adhesion regions than in the adhesion regions. This also has the effect that less adhesive or adhesive material is applied in the hybrid adhesion regions than in the adhesion regions.

To reduce the applied adhesive or the adhesive material in the hybrid adhesion regions, a combination of two or all of the measures described above is preferred, namely that the material strand has a variable strand cross-section, that the maximum deflection of the pattern with reference to the center line is less in the hybrid adhesion regions than in the adhesion regions, and that the distance between two consecutive intersection points of the pattern with the center line is greater in the hybrid adhesion regions than in the adhesion regions.

Preferably, the workpieces are fixed in place on one another after application of the adhesive to the first joining surface, in particular pressed onto one another. This can take place by means of a hold-down mechanism of the self-piercing riveting apparatus with which the other joining means are also introduced, if these are configured as self-piercing rivets, or by means of special clamping apparatuses. In this regard, the joining surfaces lie opposite one another and delimit the intermediate gap in which the material strand is arranged, wherein an adhesive hardening phase of the adhesive begins. It is then practical if the workpieces are joined to one another after the start of the adhesive hardening phase, with the aid of the further joining means, but, in particular, before the adhesive has hardened.

Preferably, the hybrid adhesion regions have a length, in the application direction, that corresponds at least to a cross-sectional surface of the further joining means. For example, the length can correspond approximately to 1.5 times, 2 times or 3 times the cross-sectional surface of the further joining means. Furthermore, the hybrid adhesion regions preferably have approximately the same length in the application direction.

Preferably, the adhesion regions have a length, in the application direction, that corresponds at least to a strand cross-section of the material strand. Specifically, the narrowest adhesion region is at least as wide as the strand cross-section of the material strand.

Preferably, the adhesion regions have a length approximately 1.5 times, 2 times or 3 times the length of the hybrid adhesion regions, and have approximately the same length in the application direction.

The further joining means can be weld connections and, in particular, weld points. It is practical if these are arranged along the application track. However, the further joining means can also be joining bodies that are introduced through the workpieces and the material strand, wherein preferably rivets, for practical purposes self-piercing rivets, are used. Also, the use of both welding points and joining bodies is possible, wherein, for example, welding points can be used in a first section of the application track, and joining bodies can be used in a second section of the application track.

It is practical if at least one further workpiece is joined to at least one of the two workpieces, specifically either simultaneously with joining of the two workpieces or with a time offset. In this regard, individual ones or all of the joining bodies can also penetrate more than two workpieces. The at least one further workpiece can be joined on in conventional manner or by means of the method according to the invention.

Figure 2:
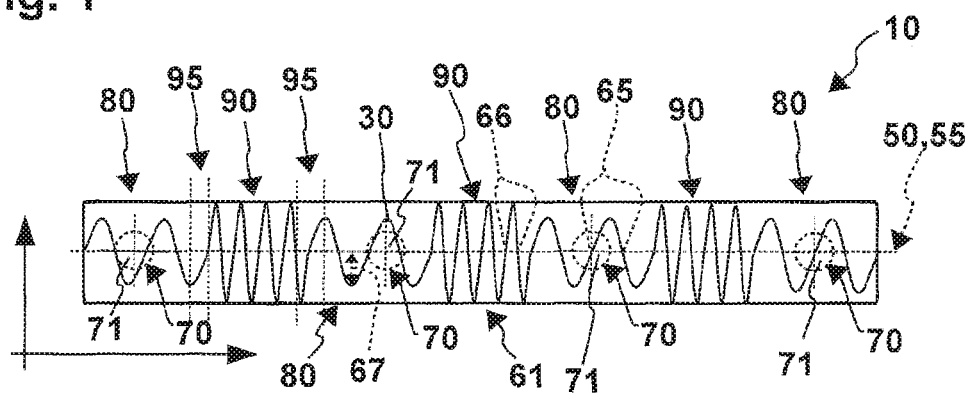
Figure 3:
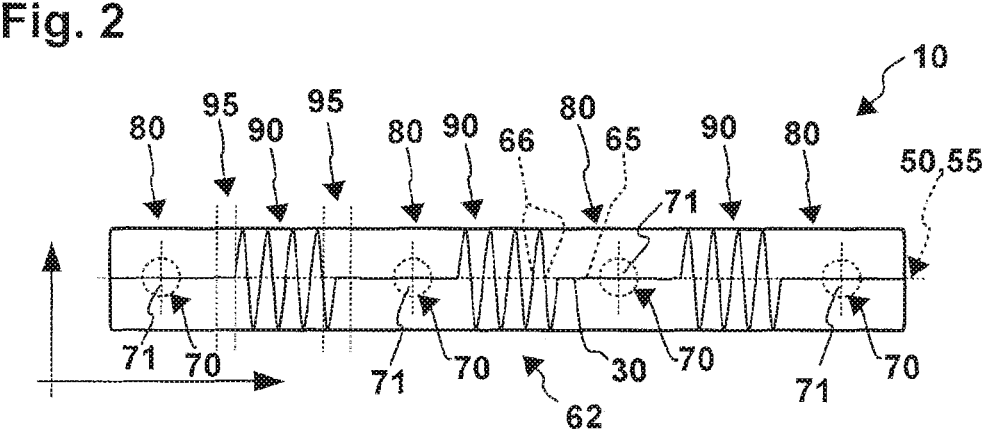

In the following, the invention will be explained in greater detail using the exemplary embodiments shown schematically in the drawing. The figures show:

FIG. 1 a schematic top view of a joining surface of a workpiece, to which surface a material strand is applied in a first wave pattern, FIG. 2 a schematic top view of a joining surface of a workpiece, to which surface a material strand is applied in a second wave pattern, FIG. 3 a schematic top view of a joining surface of a workpiece, to which surface a material strand is applied in a third wave pattern.

In the drawing, a workpiece 10, which is joined to a second workpiece, not shown in any detail, is shown schematically. It has a flat structure and is, in particular, a metal sheet. The workpiece 10 furthermore has a joining surface 20, which is also referred to as the first joining surface 20. It comprises multiple hybrid adhesion regions 80 and adhesion regions 90, arranged alternately, wherein the hybrid adhesion regions 80 are characterized in that they are intended for accommodating a joining body 70, in each instance, that serves for joining both workpieces 10 in addition to the adhesive, so that a hybrid connection is produced in the hybrid adhesion regions 80.

In the region of the hybrid adhesion regions 80 and the adhesion regions 90, a material strand 30 that consists of a viscous adhesive, which strand is used to glue the workpieces 10 together, is applied to the joining surface 20. The material strand 30 is applied continuously along an application track 50 that extends in the application direction 40. The application track 50 is a straight line, as an example. It could also be arc-shaped or wave-shaped or have a bend. The material strand 30 is applied oscillating about a center line 55 of the application track 50, wherein in the first exemplary embodiment according to FIG. 1, it forms a first wave pattern 60, in the second exemplary embodiment according to FIG. 2, it forms a second wave pattern 61, and in the third exemplary embodiment according to FIG. 3, it forms a third wave pattern 62.

The amount of adhesive applied in the hybrid adhesion regions 80, with reference to their length in the application direction 40, is supposed to be less than the amount of adhesive applied in the adhesion regions 90, with reference to their length in the application direction 40. This means that the amount of adhesive applied per length unit in the application direction 40 is less in the hybrid adhesion regions 80 than the amount of adhesive applied per length unit in the application direction 40 in the adhesion regions 90. In order to reduce the amount of adhesive applied in the hybrid adhesion regions 80, it is provided that the wave pattern 60 is configured differently in the hybrid adhesion regions 80 and the adhesion regions 90.

For this purpose, the distance between two consecutive intersection points 65 of the first wave pattern 60 with the center line 55 is varied in the hybrid adhesion regions 80 and/or in the adhesion regions 90. The distance between two consecutive intersection points 65 of the first wave pattern 60 with the center line 55 is greater in the hybrid adhesion regions 80 than in the adhesion regions 90. In the hybrid adhesion regions 80, the first wave pattern 60 has a lesser frequency, so to speak, than in the adhesion regions 90. In total, a shorter material strand 30 can thereby be implemented in the hybrid adhesion regions 80.

Furthermore, each wave pattern 60, 61, 62 has a maximum deflection 67 with reference to the center line 55 in a transverse direction 41 that runs transverse to the application direction 40. In the case of the second wave pattern 61 (FIG. 2), in addition to the reduced frequency, the maximum deflection 67, which can also be referred to as amplitude, is less in the hybrid adhesion regions 80 than in the adhesion regions 90. This measure further shortens the material strand 30 in the hybrid adhesion regions 80 as compared to the first wave pattern 60.

A transition region 95 is arranged between each hybrid adhesion region 80 and each adhesion region 90. In the transition regions 95, the maximum deflection 67 of the second wave pattern 61 with reference to the center line 55 changes continuously or suddenly. In the transition regions 95, the distance between two consecutive intersection points 65, 66 of both the first wave pattern 60 and the second wave pattern 61 also changes continuously or suddenly. As a result, the application of adhesive in the hybrid adhesion regions 80 can be particularly low.

According to FIG. 3, a third wave pattern 62 is shown, which represents a special case. The third wave pattern 62 has a maximum deflection 67 and a distance between two consecutive intersection points 65, 66, in the hybrid adhesion regions 80, that are almost zero in terms of amount. By means of this measure, the application of adhesive in the hybrid adhesion regions 80 can be further reduced in comparison to the adhesion regions 90.

It can also be provided that the material strand 30 has a variable strand cross-section. In order to apply less adhesive in the hybrid adhesion regions 80, the strand cross-section of the material strand 30 can be set to be less in the hybrid adhesion regions 80 than in the adhesion regions 90. This results in a lesser volume of adhesive, a smaller material strand 30, so to speak, in the hybrid adhesion regions 90.

After application of the adhesive to the first joining surface 20, the workpieces 10 are fixed in place on one another with joining surfaces 20 that lie opposite one another. For example, the workpieces 10 are pressed onto one another. After fixation, the adhesive begins to harden. During this hardening phase, joining bodies 70, indicated with dotted lines, are introduced through the workpieces 10. The joining bodies 70 are rivets, preferably self-piercing rivets, as they are used in hybrid joining of sheet-metal parts or the like. The joining bodies 70 are introduced in every hybrid adhesion region 80, so as to fix the workpieces 10 in place on one another.

The hybrid adhesion regions 80 have a length, in the application direction 40, that corresponds at least to a cross-sectional surface 71 of the joining body 70. The hybrid adhesion regions 80 can also be longer in the application direction 40, for example 1.5 times, 2 times or 3 times as long.

Preferably, the adhesion region 90 is at least as long in the application direction 40 as the width of the strand cross-section of the material strand. However, the adhesion region 90 is preferably precisely as long as a hybrid adhesion region 80; preferably, it is 1.5 times, 2 times or 3 times as long.

The use of joining bodies 70 in the present exemplary embodiment is not the only possibility for creating a hybrid connection. In particular, the self-piercing rivets 70 shown in the drawing can be replaced, in whole or in part, with weld connections, in particular in the form of weld points.

The invention claimed is:

1. A method for joining first and second workpieces (10),
wherein each workpiece has a joining surface (20) for joining the workpieces (10),
wherein a viscous adhesive in the form of a continuous material strand (30) is applied to a first joining surface (20), along an application track (50) that extends in an application direction (40),
wherein the application track (50) comprises a plurality of identical length units measured in the application direction (40),
wherein the continuous material strand (30) is applied to the first joining surface (20) in a plurality of alternately arranged hybrid adhesion regions (80) and adhesion regions (90) along the application track (50),
wherein the joining surfaces (20) are arranged to lie opposite one another so as to delimit an intermediate gap in which the material strand (30) is arranged,
wherein the workpieces (10) are joined to one another in the region of the material strand (30), with the aid of at least one further joining means (70) selected from the group consisting of weld connections and joining bodies,
wherein the at least one further joining means (70) is arranged in each hybrid adhesion region (80) and penetrates the material strand (30),
wherein the amount of adhesive applied in the hybrid adhesion regions (80), per length unit measured in the application direction (40), is less than the amount of adhesive applied in the adhesion regions (90), per length unit measured in the application direction (40),
wherein the material strand (30) forms a first pattern in the adhesion regions (90) and a second pattern different from the first pattern in the hybrid adhesion regions (80),
wherein the first and second patterns are formed in such a manner that the material strand is applied oscillating about a center line (55) of the application track (50), and
  (a) the distance between two consecutive intersection points (65, 66) of the material strand with the center line (55) is greater in the hybrid adhesion regions (80) than the distance between two consecutive points along or intersecting the center line (55) in the adhesion regions (90); and/or
  (b) the maximum deflection (67) of the material strand with reference to the center line (55) is less in the hybrid adhesion regions (80) than in the adhesion regions (90); and/or
  (c) the material strand (30) has a variable strand cross-section, wherein the strand cross-section is smaller in the hybrid adhesion regions (80) than in the adhesion regions (90).

2. The method according to claim 1,
wherein the distance between two consecutive intersection points (65, 66) of the first pattern and the second pattern (60, 61, 62) with the center line (55) is constant within the hybrid adhesion regions (80) and the adhesion regions (90), in each instance, and/or
wherein the maximum deflection (67) of the first pattern and the second pattern (60, 61, 62) with reference to the center line (55) is constant within the hybrid adhesion regions (80) and the adhesion regions (90), in each instance.

3. The method according to claim 1, wherein a transition region (95) is arranged between a hybrid adhesion region (80) and an adhesion region (90), in each instance, in which transition region (95) the maximum deflection (67) of the material strand with reference to the center line (55) and/or the distance between two consecutive intersection points (65, 66) of the material strand with the center line (55) changes continuously or suddenly.

4. The method according to claim 1,
wherein the workpieces (10) are fixed in place on one another after application of the adhesive to the first joining surface (20) so that the joining surfaces (20) lie opposite one another and delimit the intermediate gap in which the material strand (30) is arranged, so that an adhesive hardening phase of the adhesive begins,
wherein the workpieces (10) are joined to one another after the start of the adhesive hardening phase, in terms of time, by the further joining means (70).

5. The method according to claim 1, wherein the hybrid adhesion regions (80) have a length in the application direction (40) that at least corresponds to a cross-section surface (71) of the further joining means (70).

6. The method according to claim 1, wherein the adhesion regions (90) have a length in the application direction (40) that at least corresponds to a strand cross-section of the material strand (30).

7. The method according to claim 1, wherein the further joining means are weld connections at least in part.

8. The method according to claim 7, wherein the weld connections are arranged along the application track (50).

9. The method according to claim 1, wherein the further joining means are joining bodies (70), at least in part, which are introduced through the workpieces (10) and the material strand (30).

10. The method according to claim 9, wherein the joining bodies (70) are rivets.

11. The method according to claim 1, wherein at least one further workpiece is joined to at least one of the workpieces (10).

12. An arrangement of at least first and second workpieces (10),
wherein the workpieces (10) are arranged in pairs, lying at least partially opposite one another, and delimit an intermediate gap,
wherein an adhesive is arranged in at least one of the intermediate gaps, which adhesive is applied to a first joining surface (20) of a workpiece (10) in the manner of using the method according to claim 1, so as to join the workpieces (10) to one another, and
wherein the workpieces (10) are additionally joined to one another in the region of the hybrid adhesion regions (80) with the aid of further joining means (70) selected from the group consisting of weld connections and joining bodies arranged and penetrating the material strand (30) in each of the hybrid adhesion regions (80).

* * * * *